United States Patent

Skoog

Patent Number: 5,623,491
Date of Patent: Apr. 22, 1997

[54] DEVICE FOR ADAPTING NARROWBAND VOICE TRAFFIC OF A LOCAL ACCESS NETWORK TO ALLOW TRANSMISSION OVER A BROADBAND ASYNCHRONOUS TRANSFER MODE NETWORK

[75] Inventor: Frederick H. Skoog, Colleyville, Tex.

[73] Assignee: DSC Communications Corporation, Plano, Tex.

[21] Appl. No.: 408,698

[22] Filed: Mar. 21, 1995

[51] Int. Cl.$^6$ .................................................. H04L 12/66
[52] U.S. Cl. .................... 370/397; 370/404; 370/466; 370/468; 370/477
[58] Field of Search ............... 370/60.1, 60, 94.1, 370/94.2, 58.1, 58.2, 58.3, 110.1, 118, 32.1, 16.1, 95.1, 79, 84, 85.13; 379/3, 406, 410

[56] References Cited

U.S. PATENT DOCUMENTS

| | | | |
|---|---|---|---|
| 5,287,348 | 2/1994 | Schmidt | 370/60.1 |
| 5,301,189 | 4/1994 | Schmidt | 370/94.1 |
| 5,305,308 | 4/1994 | English et al. | 370/32.1 |
| 5,327,421 | 7/1994 | Hiller et al. | 370/60.1 |
| 5,375,118 | 12/1994 | Rao et al. | 370/94.1 |
| 5,436,899 | 7/1995 | Fujino et al. | 370/60 |
| 5,457,684 | 10/1995 | Bharucha et al. | 370/60.1 |
| 5,483,527 | 1/1996 | Doshi et al. | 370/94.2 |

*Primary Examiner*—Wellington Chin
*Assistant Examiner*—Huy D. Vu
*Attorney, Agent, or Firm*—Baker & Botts, L.L.P.

[57] ABSTRACT

A voice adaptation device (18) provides an interface between a narrowband local access network and a broadband asynchronous transfer mode (ATM) backbone network (16). The voice adaptation device (18) includes a T1/E1 network adaptor (50) that converts T1/E1 signals carrying narrowband voice traffic into an ATM cell format. The T1/E1 network adaptor (50) also performs echo cancelling, voice enhancement, digital voice protocol conversion, and compression/decompression on the narrowband voice traffic. The voice adaptation device (18) also includes a synchronous optical network formatter (52) that places ATM cells generated by the T1/E1 network adaptor (50) into synchronous optical network signals. The synchronous optical network signals are transmitted across the broadband ATM backbone network (16).

11 Claims, 4 Drawing Sheets

5,623,491

DEVICE FOR ADAPTING NARROWBAND VOICE TRAFFIC OF A LOCAL ACCESS NETWORK TO ALLOW TRANSMISSION OVER A BROADBAND ASYNCHRONOUS TRANSFER MODE NETWORK

TECHNICAL FIELD OF THE INVENTION

The present invention relates in general to telecommunications systems and architectures and more particularly to a device for adapting narrowband voice traffic of a local access network to allow transmission over a broadband asynchronous transfer mode network and to provide a means for voice traffic to originate on a narrowband network telephone and terminate on a broadband network user terminal and the reverse even when dissimilar digital voice protocols are involved.

BACKGROUND OF THE INVENTION

Existing narrowband telecommunications networks provide the primary means for carrying voice traffic between source and destination units. However, the existing narrowband telecommunications networks may not be able to handle the increasing capacity of voice as well as data and video traffic. Another problem arises in that these existing narrowband telecommunications networks include voice dominated digital local office, transit, and private network switches that will be in place for a long time due to the substantial investment in hardware and service software put into these digital switches. Network service providers will want to preserve the functionality of their existing revenue producing voice network systems and still be able to handle the increased capacity of the voice, data, and video traffic. Network service providers desire to reduce operational and maintenance cost by supporting only one backbone network that supports all services—voice, data, image, and video.

Further, the conventional backbone network upon which local access networks rely on uses a synchronous transfer mode signaling format that takes the form of DS0 level signals multiplexed within DS1 level signals, in turn multiplexed within DS3 level signals or as VT1.5 signals embedded within Synchronous Optical Network (SONET) STS-1 signals, in turn multiplexed within higher level SONET signals. However, Asynchronous Transfer Mode (ATM) formats allow DS0, DS1, DS3, and other service traffic types to be individually or collectively, in groups, multiplexed directly into concatenated payloads of high-speed, high-capacity circuits for transport and routing/switching purposes. The benefits of asynchronous transfer mode bandwidth management including fast path restoration and efficient bandwidth utilization drives a desire to use the asynchronous transfer mode format as the backbone for the transmission of voice traffic. Therefore, it is desirable to implement an asynchronous transfer mode backbone with existing narrowband telecommunications networks to handle increasing capacity in voice, data, and video traffic.

An ATM backbone network will need to deal with a number of new conditions. One of these conditions will be voice traffic that has not been treated to remove access network impairments before entering the broadband network as ATM traffic streams. In such a case there will be required a device that serves as a network resource to be used for network provided voice treatment.

From the foregoing, it may be appreciated that a need has arisen for a broadband asynchronous transfer mode backbone network that can ease the increasing capacity of existing local narrowband telecommunications networks. A need has also arisen to adapt narrowband voice services for transmission along the broadband backbone network. Further, a need has arisen for a new network element that provides an effective network interworking capability to allow conversion between existing narrowband telecommunication networks and the backbone broadband network.

SUMMARY OF THE INVENTION

In accordance with the present invention, a device for adapting narrowband voice traffic (that is traffic composed of services provided at 1,544 Mbps or less) of a local access network to allow transmission over a broadband asynchronous transfer mode network is provided that substantially eliminates or reduces disadvantages and problems associated with voice transmission over existing narrowband telecommunications networks.

According to an embodiment of the present invention, there is provided a device for adapting narrowband voice traffic of a local access network to allow transmission over a broadband asynchronous transfer mode network that includes a network interface circuit operable to receive narrowband voice traffic from and send narrowband voice traffic to the local access network. A transceiver circuit provides framing and timing conversion functions to the narrowband voice traffic, voice processing circuit may be used to eliminate echo and improve voice quality, and a cell adaptor circuit converts the narrowband voice traffic to and from asynchronous transfer mode cells. A formatter circuit transfers and receives synchronous optical network signals carrying the asynchronous transfer mode cells to and from the broadband asynchronous transfer mode network.

The present invention provides various technical advantages over existing narrowband telecommunications networks. For example, one technical advantage is in converting narrowband voice traffic into broadband asynchronous transfer mode cells. Another technical advantage is in preserving the functionality of existing narrowband telecommunications network while still taking advantage of the benefits of asynchronous transfer mode technology. Yet another technical advantage is in providing a device that interfaces between local access narrowband networks and a backbone broadband asynchronous transfer mode network. Yet another technical advantage is in providing a device that adapts dissimilar digital voice streams such that calls originating on incompatible network terminals can communicate. Yet another technical advantage is in providing a device that accepts down loadable software from a network management center to perform processing on voice traffic or voice band data traffic and provides a processing engine to accomplish such processing. This processing can include but is not limited to voice enhancement, voice protocol conversion, encryption, voice compression/decompression, and Synchronous Data Link Control/High-Level Data Link Control (SDLC/HDLC) compression for traffic carried in one or more DS0 signals between the narrowband access network and the broadband backbone network. Yet another technical advantage is in providing an ATM switch server capability to perform voice treatment functions, when required, within the broadband network for traffic that entered the network without being properly treated. This device configuration would not have DS1 (T1/E1)physical ports, but would reconstruct the DS1 circuits from incoming streams, individually treat the DS0 voice channels within the DS1 circuits and then convert the circuits back into ATM cell streams to be forwarded to their intended destination. It is required that both directions of the voice connection are routed through the same service circuit. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
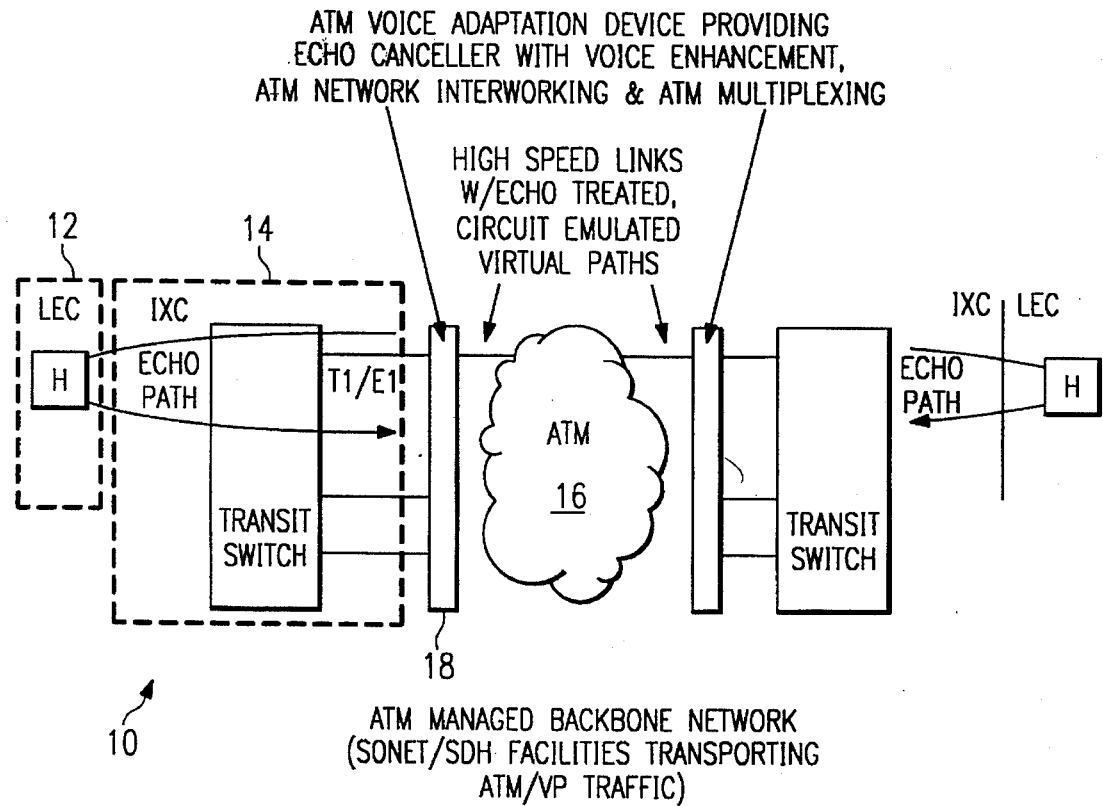
FIG. 1 illustrates a block diagram of a broadband asynchronous transfer mode backbone network interfaced with local access narrowband networks of an inter-exchange carrier.

FIG. 1 is a block diagram of a portion of a telecommunications network 10. Telecommunications network 10 includes a local exchange carrier 12 and an inter-exchange carrier 14. Local exchange carrier 12 and inter-exchange carrier 14 generate and transmit narrowband voice traffic in T1/E1 signals to other local exchange carriers, other inter-exchange carriers, or local subscribers directly connected to local exchange carrier 12 or inter-exchange carrier 14. Telecommunications network 10 also includes a broadband asynchronous transfer mode (ATM) backbone network 16 as opposed to the synchronous transfer mode backbone network found in conventional telecommunications networks.

In order to provide interoffice transport of narrowband voice traffic within telecommunications network 10, the T1/E1 signals need to be transformed into an ATM cell format. Transformation of T1/E1 signals into the ATM cell format is performed by a voice adaptation device 18. Voice adaptation device 18 performs the function of adapting DS1 (T1/E1)signals having a continuous bit rate, primarily carrying voice services, to synchronous optical network (SONET) signals carrying traffic in the ATM cell format.

Voice adaptation device 18 also conditions all voice traffic for enhanced voice quality and cleans all voice traffic of voiceband echo originating in the carrier networks with access to ATM backbone network 16. Voice adaptation device 18 may also compress the T1/E1 signals such that less than a total of the input/output service capacity is actually transferred across ATM backbone network 16. Modification of the virtual path identifier field within the asynchronous transfer mode cell format may be performed by voice adaptation device 18 in order to adjust the routing of the SONET signals to avoid network faults or network congestion points.

Figure 2:
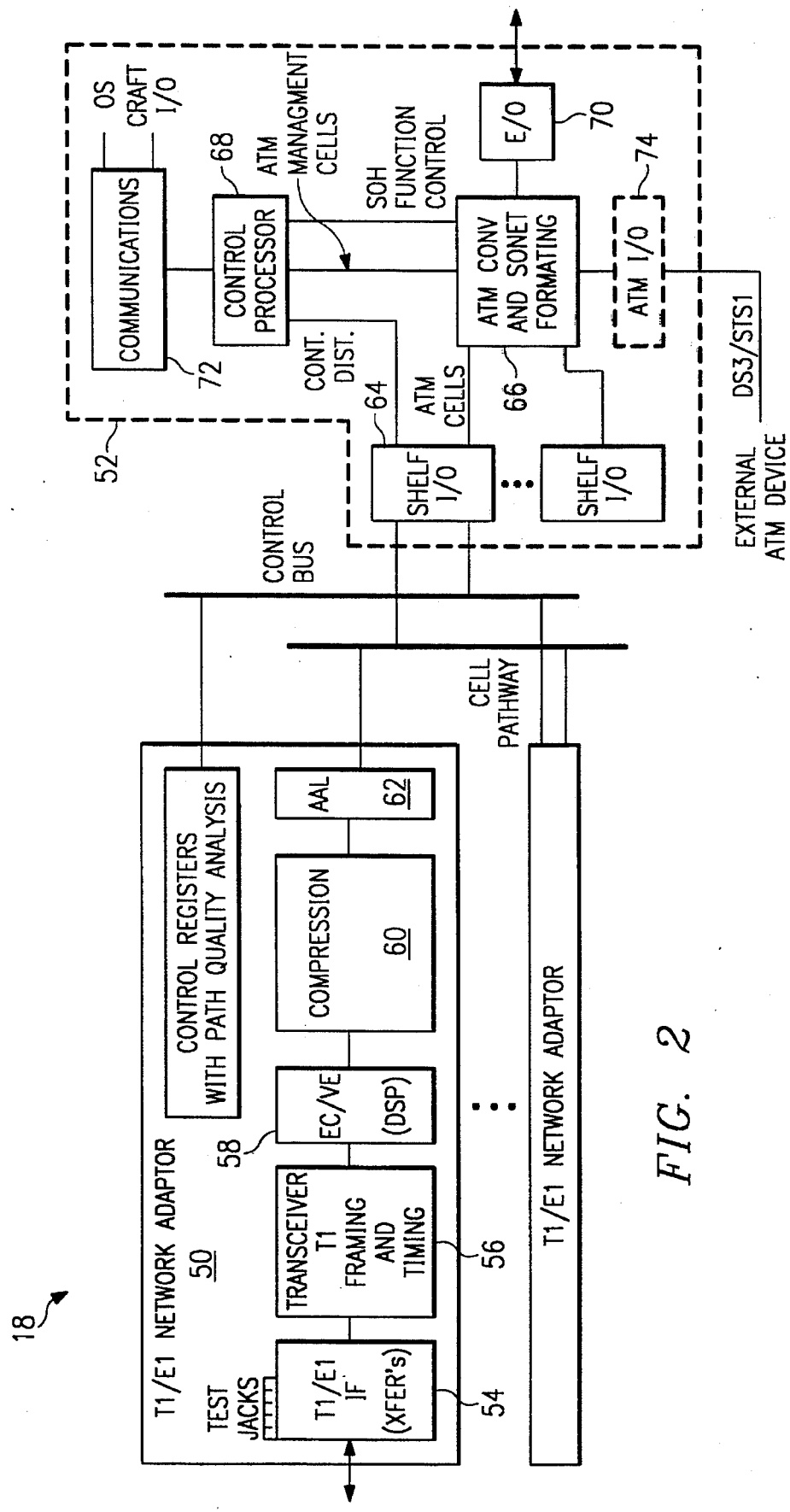
FIG. 2 illustrates a block diagram of an asynchronous transfer mode voice adaptation device for use in interfacing to and from the asynchronous transfer mode backbone network.

FIG. 2 is a block diagram of a voice adaptation device 18. Voice adaptation device 18 includes a T1/E1 network adaptor 50 and a synchronous optical network (SONET) formatter 52. T1/E1 network adaptor 50 transforms T1/E1 signals primarily carrying narrowband voice services to and from asynchronous transfer mode cell format. Synchronous optical network formatter 52 places asynchronous transfer mode cells into and recovers asynchronous transfer mode cells from synchronous optical network signals for transmission to and from broadband ATM backbone network 16, respectively.

In the inbound direction towards broadband ATM backbone network 16, T1/E1 network adaptor 50 of voice adaptation device 18 receives local T1/E1 signals at a T1/E1 interface 54. T1/E1 interface 54 includes transformers for receiving T1/E1 signals that are provided to a transceiver 56. Transceiver 56 performs framing and timing operations on the T1/E1 signals.

After transceiver 56 performs framing and timing on the T1/E1 signals, the narrowband voice traffic is sent to an echo canceler and voice enhancement unit 58. Echo canceler and voice enhancement unit 58 performs two functions. The first function is to clean the narrowband voice traffic of voiceband echo originating in the local access networks. The second function is to condition the narrowband voice traffic for enhanced voice quality. All narrowband voice traffic destined to enter broadband ATM backbone network 16 is treated in order to eliminate the potential of echo due to transmission delays.

Figure 3:
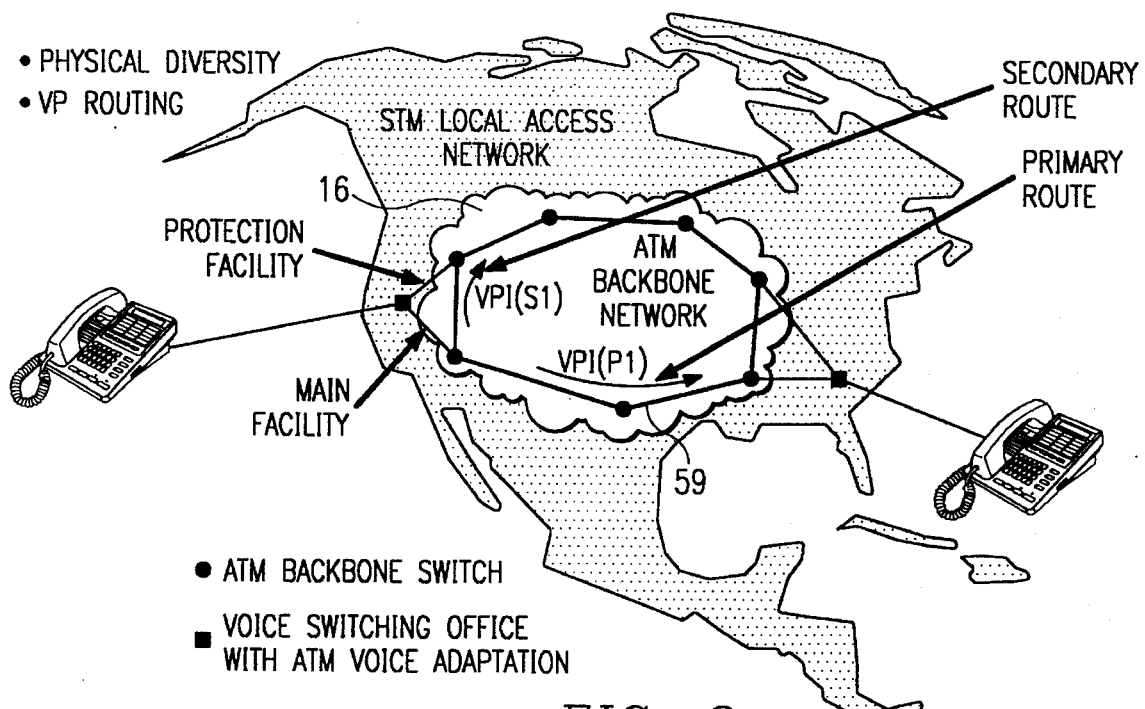
FIG. 3 illustrates a block diagram of a ring structure for the broadband asynchronous transfer mode backbone network.

The necessity to treat all narrowband voice traffic in order to eliminate potential echo problems results from the use of ring structures within broadband ATM backbone network 16. FIG. 3 shows a ring structure 59 within broadband ATM backbone network 16. Under normal conditions, information travels within ATM backbone network 16 along the primary shortest segment P1 of the ring structure with little network delay. Under abnormal conditions, the same traffic may take a secondary longer path S1 around the ring that introduces sufficient transmission delay as to require echo cancellation. Since ATM backbone network 16 functions independently, transmission delay cannot be predicted. Thus, all traffic is processed for echo cancellation.

After treatment of narrowband voice traffic by echo canceler and voice enhancement unit 58 of FIG. 2, the narrowband voice traffic may be compressed by a compression unit 60. Compression unit 60 compresses the T1/E1 signals such that less than a total of the input/output service capacity is actually transferred across the broadband ATM backbone network 16. Compression can be accomplished utilizing standard compression protocol such as Adaptive Delta Pulse Code Modulation (ADPCM) or by proprietary adaptive protocols that can greatly reduce network capacity requirements.

After the voice traffic is compressed by compression unit 60, the T1/E1 signals are adapted into asynchronous transfer mode cells by an ATM adaptation layer unit 62. Control register unit 63 provides supervision and information for operation of T1/E1 network adaptor 50.

Asynchronous transfer mode cells are processed by SONET formatter 52. SONET formatter 52 receives asynchronous transfer mode cells from T1/E1 network adaptor 50 at a shelf input/output unit 64. Shelf input/output unit 64 transfers asynchronous transfer mode cells to an ATM converger 66 under the supervision of a control processor 68. Control processor 68 may also send asynchronous transfer mode cells to ATM converger 66 for the transfer of administrative and management information.

ATM converger 66 formats asynchronous transfer mode cells from shelf input/output unit 64, from an external ATM device via an ATM input/output unit 74 and/or control processor 68 into a synchronous electrical network signal. The synchronous electrical network signal is converted to optical format by an electrical/optical converter 70. Electrical/optical converter 70 transmits synchronous optical network signals to broadband ATM backbone network 16.

SONET formatter 52 may include a communications unit 72 for downloading of operating system software to control processor 68 and provide access for external maintenance communications. SONET formatter 52 also includes the ATM input/output unit 74 that provides for direct receiving and transmitting of ATM cells from and to an external ATM device connected to SONET formatter 52.

In the outbound direction, SONET formatter 52 receives synchronous optical network signals carrying traffic in asynchronous transfer mode cell format from broadband ATM backbone network 16. The synchronous optical network signals are converted to electrical signals by electrical/optical unit 70. ATM converger unit 66 extracts ATM cells from the synchronous electrical signals as supervised by control processor 68. The ATM cells are routed to shelf input/output unit 64 for temporary storage.

T1/E1 network adaptor 50 receives ATM cells from shelf input/output unit 64 of SONET formatter 52. The ATM cells are transformed into T1/E1 signals by ATM adaptation layer unit 62. The T1/E1 signals are decompressed by compression unit 60. After decompression, T1/E1 signals are processed by echo canceler and voice enhancement unit 58.

After treatment by echo canceler and voice enhancement unit 58, the T1/E1 signals are framed and retimed by transceiver 56. Transformers within T1/E1 interface unit 54 prepare framed and timed T1/E1 signals for transmission of narrowband voice traffic to the local access network.

The use of ATM cells as generated by voice adaption device 18 for interfacing with broadband ATM backbone network 16 allows for the recovery of network transmissions in the event of faults or impairments within the backbone network. Returning to FIG. 3, primary and secondary routing paths P1 and S1 are available to carry voice traffic between end users. The selected routing path is determined by information within the virtual path identifier (VPI) field of each ATM cell. Voice adaptation device 18 can alter the VPI field during generation of ATM cells in response to an indication that the primary path P1 is not available or unable to transfer the ATM cells. Provisions are also made for redundant main and protection facility connections M1 and M2 to and from broadband ATM backbone network 16 to facilitate ATM cell transfer in the event of breakdowns in the network. This allows for continuous and efficient traffic flow between users or networks accessing broadband ATM backbone network 16.

Figure 4:
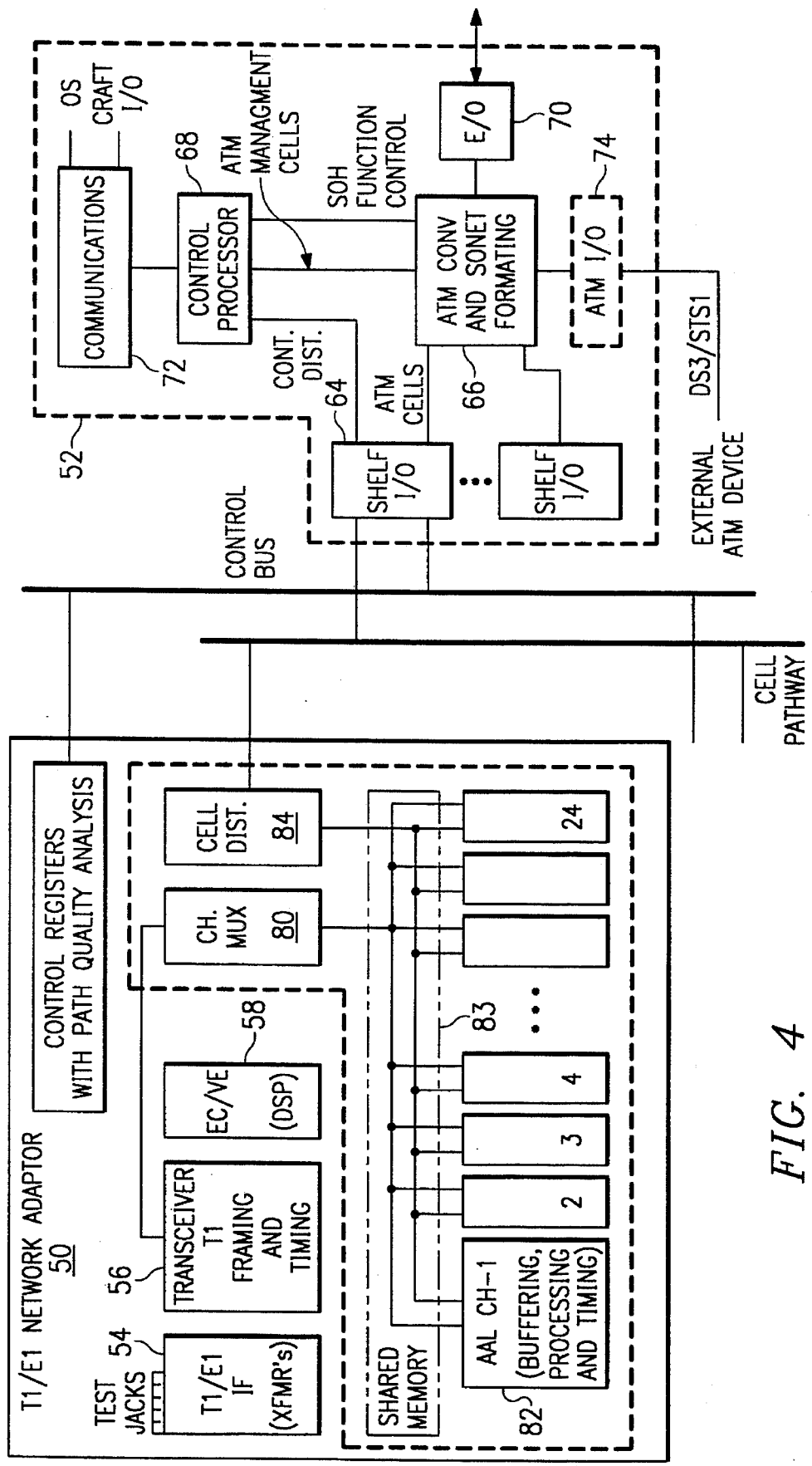
FIG. 4 illustrates a block diagram of an alternative embodiment for the voice adaptation device.

FIG. 4 is a block diagram of an alternative embodiment of T1/E1 network adaptor 50. T1/E1 network adaptor 50 may provide adaptation for DS0 level signals. ATM adaption layer 62 includes a channel multiplexer 80 that distributes individual DS0 voice channels to appropriate channel processors 82 over a shared memory 83. Channel processors 82 perform buffering, conversion, and timing operations on DS0 signals to generate ATM cells. A cell distribution unit 84 takes the ATM cells generated by each channel processor 82 and organizes the ATM cells for transmission to SONET formatter 52. The configuration of FIG. 4 allows for individual treatment of DS0 voice channels within DS1 (T1/E1)circuits.

Figure 5:
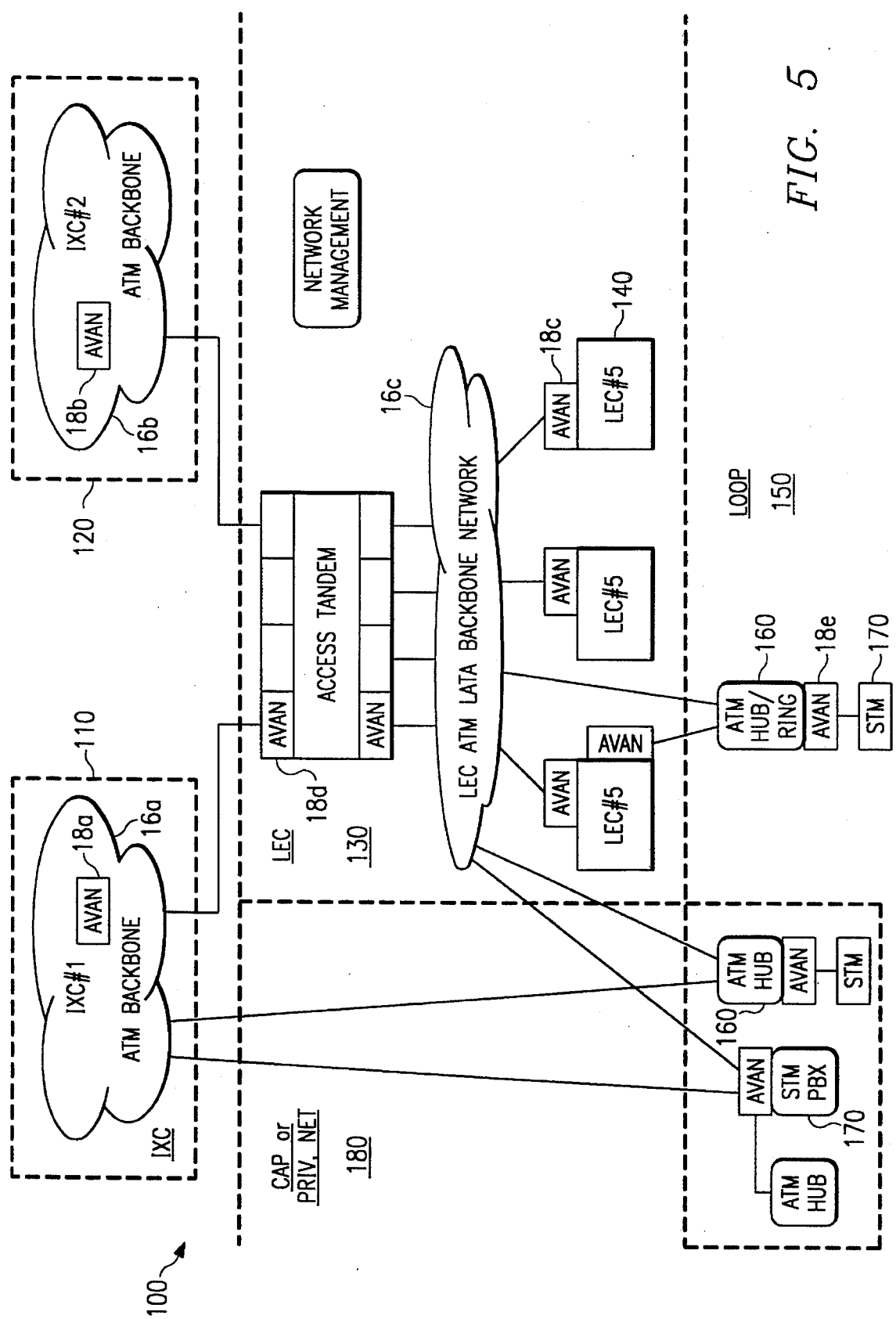
FIG. 5 illustrates different applications for the voice adaptation device within a telecommunications network.

FIG. 5 shows a block diagram of different deployments of voice adaptation device 18 within a telecommunications network 100. Telecommunications network 100 includes a first inter-exchange carrier 110 having a broadband ATM backbone network 16a and a voice adaptation device 18a. Telecommunication network 100 also includes a second inter-exchange carrier 120 having a broadband ATM backbone network 16a and a voice adaptation device 18b. Telecommunication network 100 also includes a local exchange network 130 having local exchange carriers 140 coupled to a broadband ATM backbone network 16c. Each local exchange carrier has a voice adaptation device 18c for interfacing with broadband ATM backbone network 16c. Local exchange network 130 also has an access tandem switch with a plurality of voice adaptation devices 18d to interface broadband ATM backbone network 16c with several inter-exchange carriers 110 and 120. Local exchange network 130 can communicate to a local loop 150 having an ATM hub 160, a voice adaptation device 18e, and an STM exchange 170.

Other than as a stand alone device already shown, telecommunications network 100 also includes a private network 150 with ATM hubs 160 and STM exchanges 170 coupled to local exchange network 130 and inter-exchange carrier 110. As shown in FIG. 5, voice adaptation device 18 can be employed in several application scenarios. Integration of voice adaptation unit 18 may be performed into a network side of a voice services switching system to facilitate a high speed SONET/ATM switch interface. Integration may also occur at the access side of a cross-connect system to provide wideband service interconnection to the broadband backbone network. Voice adaptation device 18 may also be integrated into customer located equipment (CLE) to terminate DS1 (T1/E1)voice traffic. Such CLE integration may be especially beneficial where private branch exchange (PBX) tie line services were aggregated for transport on a public or private broadband wide-area network. Another application for voice adaptation device 18 would be as an ATM switch server to perform voice treatment functions as required within a broadband network for voice and multimedia voice traffic from local ATM switching offices without echo cancelling or voice enhancement functions. Yet another use of the ATM switch server application is to perform voice protocol conversion so that two non-compatible terminals (e.g. a telephone and a multimedia workstation) can exchange intelligent voice traffic. An example of this condition would be when a standard Plain Old Telephone System (POTS) telephone user needs to conference into a call between two multimedia terminals using voice encoding other than u-law PCM format.

In summary, a voice adaptation device provides the interface between narrowband local access networks and a broadband asynchronous transfer mode backbone network. The voice adaptation device transforms narrowband voice traffic carried over T1/E1 signals into synchronous optical network signals having an asynchronous transfer mode cell format. The voice adaptation device performs echo cancellation, voice enhancement, and compression of T1/E1 signals in order to provide enhanced narrowband voice services.

Thus, it is apparent that there has been provided a device for adapting narrowband voice traffic for a local access network to allow transmission over a broadband asynchronous transfer mode network that satisfies the advantages set forth above. Although the preferred embodiment has been described in detail, it should be understood that various changes, substitutions, and adjustments may be made. For example, the voice adaptation device may provide some or all of the services described. Other examples may be apparent to one skilled in the art without departing from the spirit and scope of the invention as defined by the following claims.

What is claimed is:

1. A device for adapting narrowband voice traffic of a local access network to allow transmission over a broadband asynchronous transfer mode network, comprising:

a signal interface circuit operable to receive narrowband voice traffic from and send narrowband voice traffic to the local access network;

a transceiver circuit operable to provide framing and timing conversion functions to the narrowband voice traffic;

an echo canceler circuit operable to eliminate voice band echo from he narrowband voice traffic regardless of a transmission path over the broadband asynchronous transfer mode network;

a compressor circuit operable to compress and decompress the narrowband voice traffic in order to reduce a signal capacity transferred over the broadband asynchronous transfer mode network;

a cell adaptor circuit operable to convert the narrowband voice traffic to and from asynchronous transfer mode cells; and a formatter circuit operable to transfer and receive synchronous optical network signals carrying said asynchronous transfer mode cells to and from the broadband asynchronous transfer mode network, respectively.

2. The device of claim 1, further comprising:

a voice enhancer circuit operable to improve a signal quality of the narrowband voice traffic.

3. The device of claim 1, wherein said compressor circuit performs ADPCM compression on the narrowband voice traffic.

4. The device of claim 1, wherein said asynchronous transfer mode cells are routed across the broadband asynchronous transfer mode network through virtual path identifiers, said formatter circuit operable to adjust said virtual path identifiers of said asynchronous transfer mode cells in response to faults and congestion points within the broadband asynchronous transfer mode network.

5. The device of claim 1, wherein said cell adaptor circuit separates the narrowband voice traffic into individual voice channels in order to provide individual treatment for each voice channel.

6. The device of claim 5, wherein said cell adaptor circuit includes:

a channel multiplexer operable to separate and combine individual voice channels;

a plurality of channel processors operable to convert each individual voice channel to and from asynchronous transfer mode cell format;

a plurality of channel processors operable to convert each individual digital voice protocol from one digital voice protocol to another digital voice protocol; and a cell distribution unit operable to transfer asynchronous transfer mode cells to and from said plurality of channel processors.

7. A telecommunications network, comprising:

a broadband asynchronous transfer mode backbone network;

a narrowband local access synchronous transfer mode network;

a voice adaptation device operable to interface voice traffic between said broadband asynchronous transfer mode backbone network and said narrowband local access synchronous transfer mode network wherein said voice adaptation device performs echo cancellation and voice enhancement on said voice traffic regardless of a transmission path of voice traffic over the broadband asynchronous transfer mode backbone network, wherein said voice adaptation device converts narrowband voice traffic of said narrowband local access synchronous transfer mode network into synchronous optical network signals carrying voice traffic in asynchronous transfer mode cell format for transmission across said broadband asynchronous transfer mode backbone network, wherein said broadband asynchronous transfer mode backbone network transfers said synchronous optical network signals through a ring structure having a primary path and a secondary path; said voice adaptation device operable to adjust a virtual path identifier field that determines which of said primary and secondary paths is selected in response to fault indications and congestion detected by said ring structure and/or virtual path quality analysis software processing of said voice adaptation device.

8. The telecommunications network of claim 7, wherein said voice adaptation device is integrated with said broadband asynchronous transfer mode backbone network or said narrowband local access synchronous transfer mode network.

9. A method of interfacing voice traffic between a narrowband synchronous transfer mode network and a broadband asynchronous transfer mode network, comprising the steps of:

receiving voice traffic from the narrowband synchronous transfer mode network;

performing framing and timing operations on the voice traffic to place the voice traffic into a broadband timing mode;

eliminating voice band echo from the voice traffic regardless of a transmission path through the broadband asynchronous transfer mode network;

compressing the voice traffic to reduce signal capacity across the broadband asynchronous transfer mode network:

converting the voice traffic into an asynchronous transfer mode cell format;

formatting the synchronous transfer mode cells onto synchronous optical network signals for transmission across the broadband asynchronous transfer mode network.

10. The method of claim 9, further comprising the step of:
enhancing signal quality of the voice traffic.

11. The method of claim 9, further comprising the step of:
receiving synchronous optical network signals from the broadband asynchronous transfer mode network;

extracting asynchronous transfer mode cells from the synchronous optical network signals;

transforming the asynchronous network signals into synchronous transfer mode voice traffic;

performing framing and timing operations on the voice traffic to place the voice traffic into a narrowband timing mode; and transmitting the voice traffic across the narrowband synchronous transfer mode network.

* * * * *